(12) United States Patent
Pascente et al.

(10) Patent No.: US 11,354,369 B2
(45) Date of Patent: Jun. 7, 2022

(54) MULTI-HEADED WEB-APPLICATION ARCHITECTURE AND MESSAGING STRUCTURE

(71) Applicant: Raytheon Company, Waltham, MA (US)

(72) Inventors: Vincent Pascente, Aurora, CO (US); Warren Wonders, Denver, CO (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/985,366

(22) Filed: Aug. 5, 2020

(65) Prior Publication Data

US 2021/0049222 A1    Feb. 18, 2021

Related U.S. Application Data (60) Provisional application No. 62/885,994, filed on Aug. 13, 2019.

(51) Int. Cl.
| | | |
|---|---|---|
| *G06F 16/9535* | (2019.01) | |
| *G06F 16/958* | (2019.01) | |
| *G06F 16/951* | (2019.01) | |

(52) U.S. Cl.
CPC ........ *G06F 16/9535* (2019.01); *G06F 16/951* (2019.01); *G06F 16/958* (2019.01)

(58) Field of Classification Search
CPC .. G06F 16/958; G06F 16/951; G06F 16/9535; G06F 16/955
See application file for complete search history.

(56) References Cited

U.S. PATENT DOCUMENTS

| | | | |
|---|---|---|---|
| 7,730,419 B2 | 6/2010 | Schneider | |
| 9,830,304 B1* | 11/2017 | Simeonov | G06F 40/103 |
| 10,356,126 B2* | 7/2019 | Alderson | H04L 63/20 |
| 10,554,692 B2* | 2/2020 | Frisbie | H04L 63/20 |
| 2006/0168547 A1 | 7/2006 | Boyles | |
| 2009/0328063 A1* | 12/2009 | Corvera | G06F 9/54 719/315 |
| 2010/0031153 A1 | 2/2010 | Ortwein | |
| 2011/0321133 A1 | 12/2011 | Grieve | |
| 2013/0097488 A1* | 4/2013 | Coman | G06F 16/9577 715/243 |
| 2018/0121217 A1 | 5/2018 | Jarabek | |
| 2019/0272193 A1* | 9/2019 | Hu | G06F 9/44505 |
| 2020/0099752 A1* | 3/2020 | Naidu | H04L 67/141 |
| 2021/0105314 A1* | 4/2021 | Xu | G06F 9/452 |

FOREIGN PATENT DOCUMENTS

WO    2015067050 A1    5/2015

OTHER PUBLICATIONS

International Search Report and Written Opinion for corresponding International Application No. PCT/US2020/045844 dated Nov. 10, 2020.

* cited by examiner

*Primary Examiner* — Dangelino N Gortayo
(74) *Attorney, Agent, or Firm* — Renner, Otto, Boisselle & Sklar, LLP (57) ABSTRACT

A web application configured to open multiple browser windows as a parent window and multiple child windows. The multiple browser windows communicate via a broadcast channel setup by the parent window. The multiple browser windows are positioned according to a layout received from an application page that each of the browsers loads. Each window is part of a whole, single application, and not a clone of an application with a message handler.

20 Claims, 5 Drawing Sheets

MULTI-HEADED WEB-APPLICATION ARCHITECTURE AND MESSAGING STRUCTURE

RELATED APPLICATIONS

This application claims the benefit of 62/885,994 filed on Aug. 13, 2019, which is herein incorporated by reference in its entirety.

FIELD OF INVENTION

The present disclosure relates generally to web applications and more particularly to web applications spanning across multiple browser windows.

BACKGROUND

Web applications executed via a web browser are often limited to single browser windows. That is, web applications executed via an internet browser do not have the ability to act as a multi-headed display, because modern web browsers do not allow nor implement a process to handle a multi-headed (multiple window) application.

Modern workspaces often include multiple displays to improve worker efficiency. With conventional web technology, the only way to use a web application across multiple displays was to expand a single web browser window across two displays. This solution may work for some web applications and for two monitors, but this solution does not scale to monitors in excess of two and does not work reliably for displays having different resolutions, orientations, and sizes.

SUMMARY

While modern web browsers have the ability to spawn child windows from the internal browser window object, modern web browsers do not standardly govern window creation, component communication, websocket communication, and dynamic layouts between multiple interacting windows.

In a general embodiment, a multi-window web application executed within an internet browser is provided that is able to communicate between windows and with an external server. The web application is a single instance application (or session) with multiple windows (also referred to as heads) that in combination make a single application. A parent window of the web application governs the entire multi-window web browser application without passing control to child windows. The parent window also provides security control, external communication, internal communication, and dynamic layout management of web components.

In an embodiment, the web application communicates between web browser windows and components in those windows existing in a single browser session. The web application loads multiple window layouts and manages the multiple windows. Communication to a server may be handled through the parent window. The web application allows AJAX, Websocket, gRPC, and other types of communication.

According to one embodiment, there is provided a method of operating a web application using circuitry. The method includes using a parent browser window corresponding to an application page to establish a channel for sending and receiving messages. Using the parent window, a layout from the application page is loaded specifying display information for at least one child window and the parent window. The display information includes location information and at least one component for each of the at least one child window and the parent window. Using the circuitry, the parent window is positioned based on the location information for the parent window specified in the display information. Using the parent window, the at least one component for the parent window is loaded specified in the display information. For each of the at least one child window having display information specified in the layout, a new browser window is opened as a child window using the circuitry. Broadcast channel information is received with the child window and the child window joins the broadcast channel using the broadcast channel information. The child window is positioned using the circuitry based on the location information for the child window specified in the display information. Using the child window, the at least one component for the child window specified in the display information is loaded.

Alternatively or additionally, the channel includes a broadcast channel and the channel information includes broadcast channel information. The parent window and the at least one child window form a window set. When a communicating window of the window set communicates on the broadcast channel by posting a message to the broadcast channel, the message is received by the parent window and each of the at least one child window.

Alternatively or additionally, each window of the window set includes a subscription list and the subscription list identifies topics subscribed to by the at least one component loaded by the window of the window set. Upon a receiving window of the window set receiving a message, the receiving window identifies an included topic in the message. Using the subscription list, the receiving window determines a subscribing component that subscribes to the included topic. The receiving window passes the message to the subscribing component.

Alternatively or additionally, a request to load an additional component to a selected window of the window set is received. The additional component is loaded to the selected window. A subscription update from the additional component identifying an additional topic is received by the selected window. The selected window updates the subscription list to include the additional topic in association with the additional component. A request to unload an identified component from an identified window of the window set is received. The identified component from the identified window is removed. With the identified window, the subscription list is updated for the identified window to remove any subscription associated with the identified component.

Alternatively or additionally, the parent window and each of the at least one child window each load an inter-window communication interface from the application page. The inter-window communication interface receives the messages from the broadcast channel and provides the messages to the web application when the message is applicable to the web application for the window.

Alternatively or additionally, when each of the at least one child window are opened as a child window: the child window is passed a reference to the parent window and the child window requests the broadcast channel information from the parent window using the reference to the parent window.

Alternatively or additionally, when each of the at least one child window are opened as a child window: the child window receives a layout index and the child window requests the display information based on the layout index.

Alternatively or additionally, before setting the browser window as the parent window, accessing with the browser window a window manager included in the application page and the window manager labeling the browser window as the parent window. The opening of the new browser window as a child window includes opening the child window to the application page and the child window accessing the window manager. The child window requests the display information from the window manager based on the layout index.

Alternatively or additionally, the parent window communicates with the server and each of the at least one child window communicate with the server via the parent window.

Alternatively or additionally, the parent window and the at least one child window communicate using websockets.

According to another embodiment, there is provided a web application stored on a non-transitory computer readable medium that, when executed by circuitry, causes the circuitry to open a browser window to an application page on a server storing the web application in a non-transitory computer readable medium. Using a parent browser window corresponding to an application page, a channel for sending and receiving messages is established. A layout from the application page specifying display information for at least one child window and the parent window is loaded into the parent window. The display information includes location information and at least one component for each of the at least one child window and the parent window. The parent window is positioned based on the location information for the parent window specified in the display information. The at least one component for the parent window specified in the display information is loaded into the parent window. For each of the at least one child window having display information specified in the layout, a new browser window is opened as a child window and broadcast channel information is received with the child window. The child window is caused to join the broadcast channel using the broadcast channel information. The child window is positioned based on the location information for the child window specified in the display information. The at least one component for the child window specified in the display information is loaded into the child window.

According to a further embodiment, there is provided a web application stored on a non-transitory computer readable medium that, when executed by circuitry, causes the circuitry to open a browser window to an application page on a server storing the web application in a non-transitory computer readable medium. The browser window is set as a parent window. Using a parent browser window corresponding to an application page, a channel for sending and receiving messages is established. A layout from the application page specifying display information for at least one child window and the parent window is loaded into the parent window. The display information including location information and at least one component for each of the at least one child window and the parent window. The parent window is positioned based on the location information for the parent window specified in the display information. The at least one component for the parent window specified in the display information is loaded into the parent window. For each of the at least one child window having display information specified in the layout, a new browser window is opened as a child window. Broadcast channel information is received with the child window. The child window joins the broadcast channel using the broadcast channel information. The child window is positioned based on the location information for the child window specified in the display information. The at least one component for the child window specified in the display information is loaded into the child window. The channel includes a broadcast channel and the channel information includes broadcast channel information. The parent window and the at least one child window form a window set. When a communicating window of the window set communicates on the broadcast channel by posting a message to the broadcast channel, the message is received by the parent window and each of the at least one child window.

Alternatively or additionally, each window of the window set includes a subscription list and the subscription list identifies topics subscribed to by the at least one component loaded by the window of the window set. Upon a receiving window of the window set receiving a message, the receiving window identifies an included topic in the message and, using the subscription list, the receiving window determines a subscribing component that subscribes to the included topic. The receiving window passes the message to the subscribing component.

Alternatively or additionally, a request to load an additional component to a selected window of the window set is received. The additional component is loaded to the selected window. The selected window receives a subscription update from the additional component identifying an additional topic. The selected window updates the subscription list to include the additional topic. A request to unload an identified component from an identified window of the window set is received. The identified component is removed from the identified window. The identified window updates the subscription list for the identified window to remove any subscription associated with the identified component.

Alternatively or additionally, the parent window and each of the at least one child window each load an inter-window communication interface from the application page. The inter-window communication interface receives the messages from the broadcast channel and provides the messages to the web application when the message is applicable to the web application for the window.

Alternatively or additionally, when each of the at least one child window are opened as a child window, the child window is passed a reference to the parent window and the child window requests the broadcast channel information from the parent window using the reference to the parent window.

Alternatively or additionally, when each of the at least one child window are opened as a child window, the child window receives a layout index and the child window requests the display information based on the layout index.

Alternatively or additionally, before setting the browser window as the parent window, the browser window accesses a window manager included in the application page and the window manager labels the browser window as the parent window. The opening of the new browser window as a child window includes opening the child window to the application page and the child window accessing the window manager. The child window requests the display information from the window manager based on the layout index.

Alternatively or additionally, the parent window communicates with the server and each of the at least one child window communicate with the server via the parent window.

Alternatively or additionally, the parent window and the at least one child window communicate using web sockets.

While a number of features are described herein with respect to embodiments of the invention; features described with respect to a given embodiment also may be employed in connection with other embodiments. The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention in which similar reference numerals are used to indicate the same or similar parts in the various views.

The present invention is now described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

DETAILED DESCRIPTION

In a general embodiment, a web application is presented that is executed via a web browser and supports multiple windows for a single application instance. The web application supports multiple windows by opening multiple browser windows as a single parent window and multiple child windows. The multiple browser windows communicate via a broadcast channel setup by the parent window. The multiple browser windows are positioned according to a layout received from an application page that each of the browser windows loads. Each window is part of a whole, single application, and is not a clone of an application with a message handler.

Figure 1:
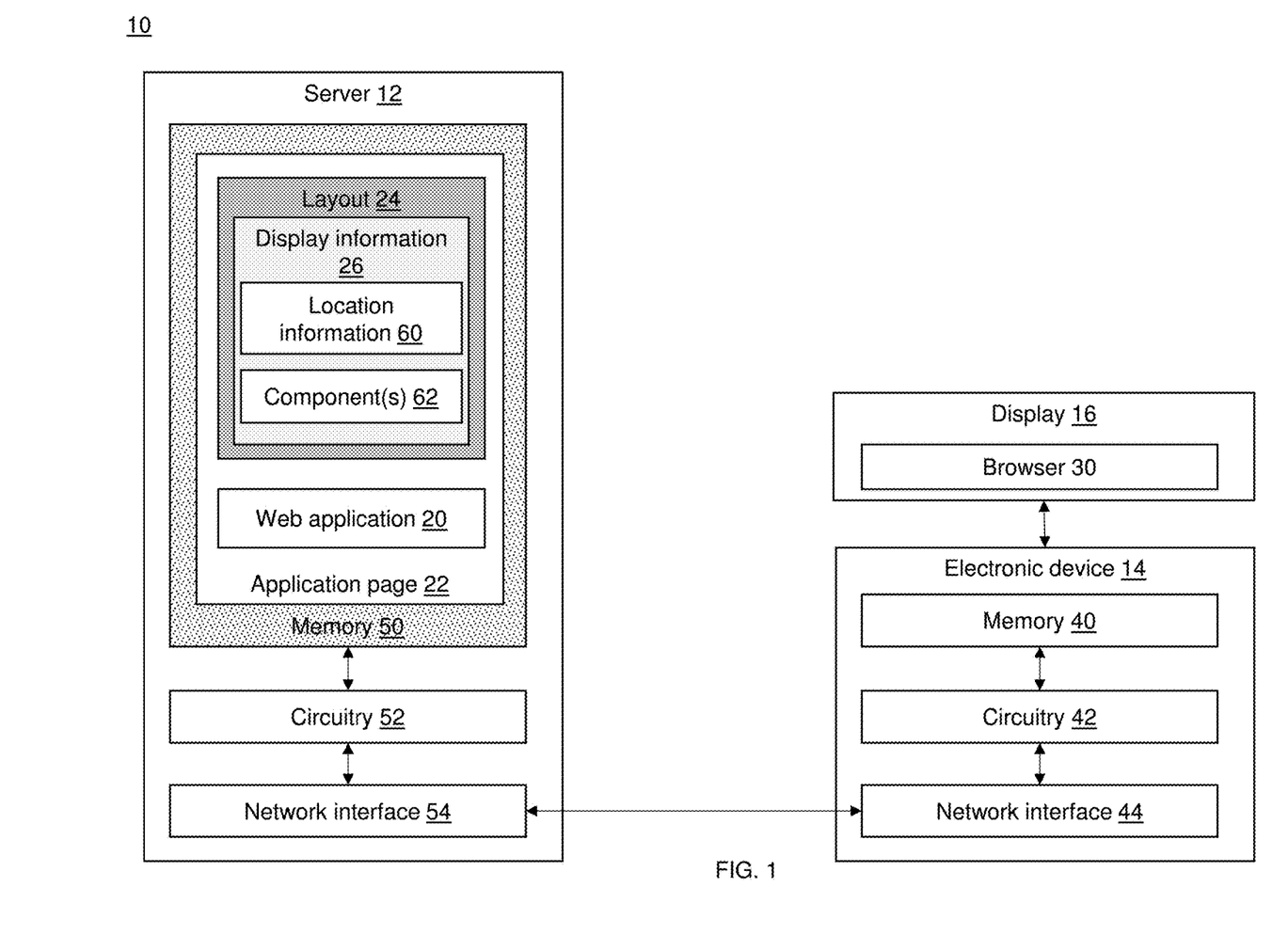
FIG. 1 is a schematic diagram of an exemplary system including a server and an electronic device having a display.
Figure 2:
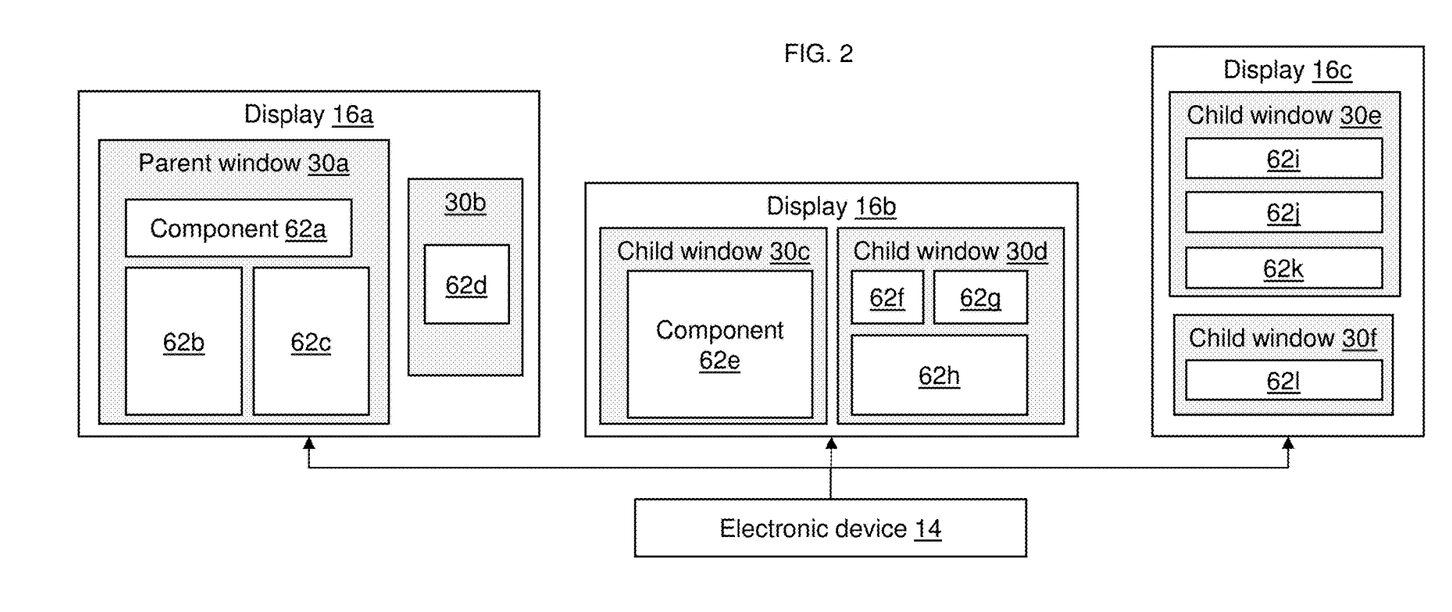
FIG. 2 is a schematic diagram of an embodiment of the system having multiple displays.

Turning to FIGS. 1 and 2, in a general embodiment, a system 10 is shown that includes a server 12 and an electronic device 14. The electronic device 14 includes or is attached to a display 16. For example, the display 16 may be formed by multiple separate monitors as shown in FIG. 2. The electronic device 14 executes a web application 20 by accessing an application page 22 via a web browser 30 (also referred to as an internet browser or as a browser). The application page 22 provides the web application 20 and a layout 24 including display information 26. Based on the layout 24, the electronic device 14 opens a parent browser window ("parent window") 30a and one or more child browser windows ("child windows") 30b-30f. The parent window 30a establishes a broadcast channel 32 for sending and receiving messages between the browser windows (also referred to as "windows") 30. Broadcast channel information 34 is then provided to the child windows 30b-30f to allow the child windows 30b-30f to send and receive messages via the broadcast channel 32.

In the embodiment shown in FIG. 1, the electronic device 14 includes a non-transitory computer readable memory (referred to as "memory") 40, circuitry 42, and a network interface 44. The electronic device 14 sends a request for accessing the application page 22 using the circuitry 42 via the network interface 44. The server 12 similarly includes non-transitory computer readable memory (referred to as "memory") 50, circuitry 52, and a network interface 54. The application page 22 is stored in the memory 50 and provided to the electronic device 14 by the circuitry 52 via the network interface 54.

The web application 20 is stored on the memory 50 of the server 12 and is executed by opening a browser window 30 (also referred to as a "browser" or a "window") to the application page 22 using the circuitry 42. The browser window 30 may be any suitable internet browser program, such as Edge, Chrome, Firefox, Internet Explorer, etc.). The circuitry 42 sets the browser window as a parent window 30a.

The parent window 30a establishes the broadcast channel 32 for sending and receiving messages between browser windows 30. Establishing the broadcast channel 32 may be performed by registering a message handler with the browser 30. Before setting the browser window 30 as the parent window 30a, the browser window may access a window manager included in the application page 22. The window manager may specify that the browser window 30 is the parent window 30a. For example, the browser window 30 may identify that the window 30 did not receive a reference to a parent window 30a and, based on this lack of a reference, the window manager may determine that the current window is the parent window 30a. Similarly, when opening subsequent new browser window(s), the new browser window(s) may access the window manager. The window manager may identify the new browser window(s) as child windows. For example, the window manager may conclude that a particular window is a child window when the window manager receives a reference to the parent window. The child window may request the display information 26 from the window manager.

The broadcast channel 32 may utilize a standard web application programming interface (API) for asynchronous messaging between same-origin browser windows. As is described in further detail below, components in each window may internally use a simple publish/subscribe methodology to communicate, while communication between windows is accomplished by forwarding these messages to other windows via the broadcast channel 32.

The parent window 30a loads a layout 24 from the application page 22. The layout 24 specifies display information 26 for at least one child window 30b, 30c, 30d, 30e, 30f and for the parent window 30a. The combination of the child window(s) 30b-30f and the parent window 30a may be referred to as a window set 30. The display information 26 includes location information 60 and components 62 for each of the child window(s) 30b-30f and the parent window 30a. For example, the location information 60 may describe a position and size of each window of the window set. The components specified in the display information 26 may specify the components to be displayed in each window along with the location and size of each of the components. Alternatively, the location information 60 may specify the size and location of the components 62. The circuitry 42 positions the parent window 30*a* based on the location information 60 for the parent window 30*a* specified in the display information 26. The parent window 30*a* also loads the components 62 for the parent window 30*a* specified in the display information. The parent window 30*a* positions the components 62 at the specified location and size in the window 30.

The components 62 may be a Javascript element, a CSS element, or any other element configured to update an area of the browser window. For example, a component 62 may be a visualization or animation (e.g., an orbit of satellites around the earth)

The layout 24 may utilize any suitable data format for providing display information 26 to the windows 30. For example, the layout 24 may include JSON Data defining the layout for each window (location information 60) and components to be loaded and their size and location (components 62).

The application page 22 may also include a window manager module that gathers user login information and window layouts. The window manager module may also initialize and load a window layout for its containing browser window (parent or child window). The window manager module may also initialize the inter-window communication interface described below as well as setup websocket management.

In the example shown in FIG. 2, the display 16 includes three separate displays 16*a* 16*b*, 16*c*. Each display 16 may be one or more display devices, such as a stand alone computer monitor, television, built in display device (e.g., a display on a tablet or phone), etc. Each of the displays 16 includes at least one window. For example, display 16*a* includes the parent window 30*a* and a child window 30*b*. As shown, the web application supports different monitor configurations (e.g., size, orientation, resolution, etc.). Each of the windows 30 may include one or more components 62. While the depicted embodiment shows each of the displays 16 including two windows 30, each of the displays may include any number of windows 30. For example, one or more of the displays may not include a window 30.

For each of the child window(s) 30*b*-30*f* having display information specified in the layout 24, the circuitry 42 opens a new browser window 30 as a child window 30*b*-30*f*. Like the parent window 30*a*, each of the child window(s) is opened to the application page 22. By opening each window 30 to the application page 22, duplication of code is avoided and a single set of code may be used to load multiple windows 30.

Opening of the child windows may be performed by an inter-window module (also referred to as an inter-window communication interface below) that creates child windows and handles all communication between child windows and between child windows and the parent window (e.g., including component communication, window opening/closing and logout, etc.). The inter-window module may utilize the standard web API to access a web-page containing browser window object.

Each of the child windows 30*b*-30*f* receives the broadcast channel information 34. For example, the parent window 30*b* may provide the broadcast channel information 34 to the child window(s) 30*b*-30*f*. As an example, when the child window 30*b*-30*f* is created, the child window may be passed a reference 88 to the parent window 30*a*. The child window 30*b*-30*f* may then use this reference 88 to request the broadcast channel information 34 (e.g., the broadcast channel name) from the parent window 30*a*. Instead of being provided by the parent window 30*b*, the broadcast channel information 34 may be provided to the child window(s) 30*b*-30*f* via the application page 22. Each of the child window(s) 30*b*-30*f* join the broadcast channel 32 using the broadcast channel information 34.

The circuitry 42 positions each of the child window(s) 30*b*-30*f* based on the location information 60 for the child window specified in the display information 26. The child window 30*b*-30*f* also loads the component(s) 62 for each of the child windows specified in the display information 26. For example, the display information may be a table of information specifying a total number of windows and location information 60 and component(s) 62 for each of the windows. Upon initialization (e.g., upon opening the application page 22), each child window 30 may receive an index. The child window 30*b*-30*f* may use the received index to access the display information 26 stored in the layout 24.

By opening the windows 30 as described above, the web application 20 may act as a contiguous web application having multiple components (e.g., sub web apps inside of the larger web application 20) spread across one or more displays 16. Modern browsers are not currently set up to act in this way (i.e., broadcast messaging and communications between windows). The web application 20 may be any type of software using multiple windows that is accessed via a browser 30 and that is readable by an internet browser 30. For example, the web application 20 may be defense contracting software.

As described above, the parent window 30*a* and the at least one child window 30*b*-30*f* form a window set. A communicating window of the window set may communicate on the broadcast channel 32 by posting a message 70 (also referred to as an inter-window message) to the broadcast channel 32. The message 70 may refer to any data placed into the broadcast channel 32. The message 70 is received by the parent window and each of the at least one child window. For example, the broadcast channel 32 may be an existing application programming interface (API) included in the browser natively. The message 70 may be received by each of the windows of the window set without intervention of the parent window 30*a*, or the parent window 30*a* may receive the message 70, and pass the message 70 to each child window 30*b*-30*f*.

Figure 3:
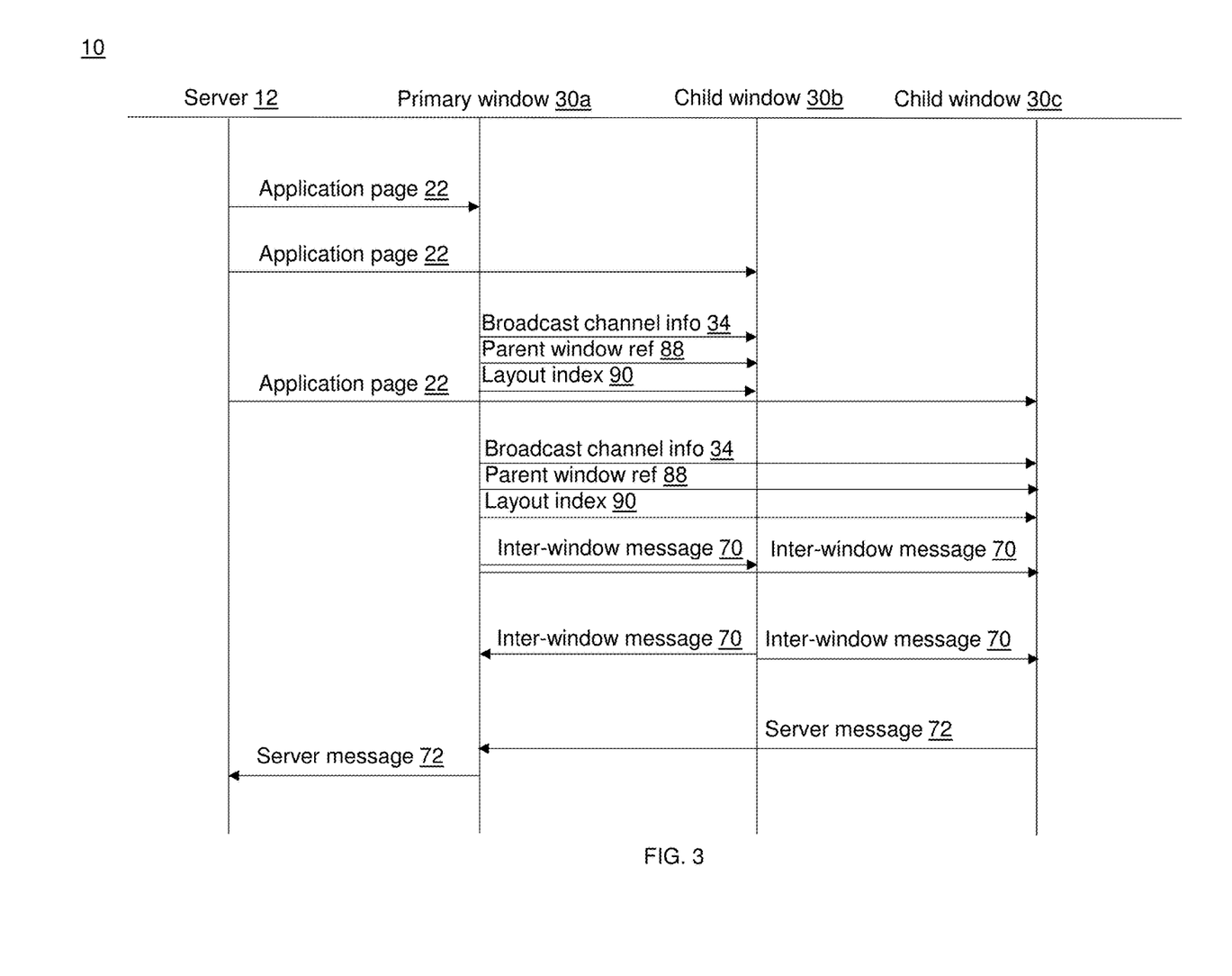
FIG. 3 is a ladder diagram depicting movement of information between the server, a primary window, and two child windows.

Exemplary communication between the server and windows 30 is shown in FIG. 3. Upon requesting communication with the application page (e.g., via a URL entered into the internet browser), the primary window 30*a* receives the application page 22 from the server 12. Then, as child windows are opened by the circuitry 42, the server 12 supplies copies of the application page 22 to the child windows 30*b*, 30*c*.

Communication between the windows may be performed on the broadcast channel 32 via websockets (as opposed to REST). By using websockets, each window 30 may make a connection to the server 12 without the server 12 needing to keep track of the connections with each of the windows 30. Similarly, upon the child windows 30*b*, 30*c* being opened, the parent windows 30*a* provides the broadcast channel information 34 to the child windows 30*b*, 30*c*.

A websocket manager (e.g., a software module) may handle websocket connections to various backend services through the parent window. For example, child windows may communicate through the parent window's websocket connections to eliminate server side confusion regarding the window of origin making the request.

Figure 4:
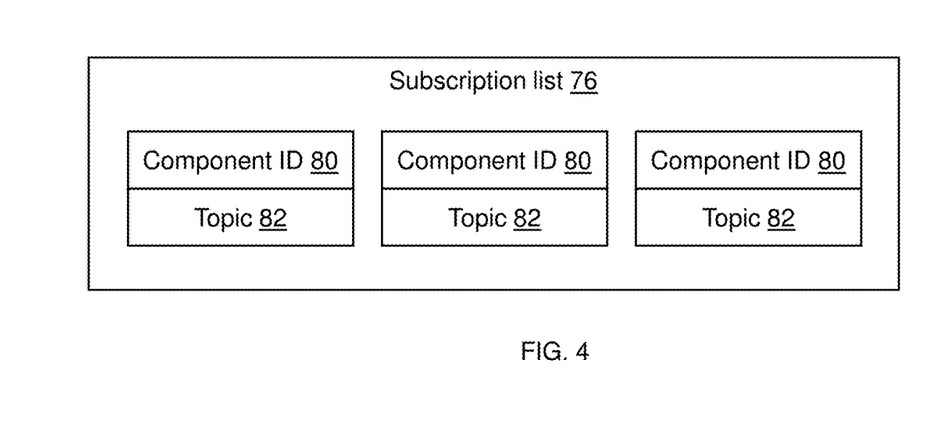
FIG. 4 is a schematic diagram of a subscription list.

As shown in FIG. 4, the web application 20 may utilize a subscription list 76 to decouple communication between components 62 so that windows 30 are not required to know which components 62 are located in which windows 30. That is, each window of the window set may include a subscription list 76 that identifies topics 82 subscribed to by the component(s) 62 loaded by the window of the window set. For example, in FIG. 2, the component 62*d* of the child window 30*b* in the first display 16*a* may subscribe to messages relating to weather. This "subscription" is noted in the subscription list 76 and is used to route weather-related messages to this component 62*d* as described below.

Upon a message being placed into the broadcast channel 32, each window receives the message 70. Each window identifies a topic included in the message 70 (an "included topic"). For example, each window may identify the topic of a message 70 based on topic information included in the message 70. As an example, each message 70 may include a unique identifier for each topic that the message pertains to. Using the subscription list 76, the receiving window may determine a subscribing component(s) 62 that subscribes to the included topic. For example, a component ID 80 may be stored in the subscription list 76 in association with a topic 82 that the component 62 subscribes to. The receiving window then passes the message to the subscribing component(s).

Continuing the example described above concerning component 62*d*, the child window 30*b* may receive the message and compare the topics included in the message 70 to the topics 82 listed in the subscription list 76. Upon finding that the message includes topics related to weather, the child window 30*b* would then pass the message to component 62*b*. Any additional component(s) 62 identified in the subscription list 76 as subscribing to topics included in the message 70 would also be passed the message 70.

By using the subscription list 76, the windows 30 and the components 62 included in the windows 30 do not need to keep track of which components 62 are open and where these components 62 are located. Rather, each of the components 62 and windows 30 may simply place a message 70 in the broadcast channel 32 and the message 70 will be routed to any open components 62 that subscribe to the topics included in the message 70.

For example, the circuitry 42 may receive a request to load an additional component 62 to a selected window 30 of the window set. The additional component 62 may be loaded to the selected window 30 and the selected window 30 may receive a subscription update from the additional component 62 identifying an additional topic that the additional component 62 subscribes to. The selected window 30 may then update the subscription list 76 to include the subscription of the additional component 62 to the additional topic 82. In this way, the web application 20 may address passing of messages between the components of the various windows 30 without requiring a record to be kept of which components 62 are loaded into which windows 30.

In addition to updating the subscription list 76 to include new components 62, the subscription list 76 may also be updated when component(s) 62 are removed from windows. For example, when the circuitry 42 receives a request to unload an identified component 62 from an identified window 30 of the window set. The identified window 30 removes the identified component 62. The identified window 30 also updates the subscription list 76 for the identified window 30 to remove any subscription associated with the identified component 62.

Figure 5:
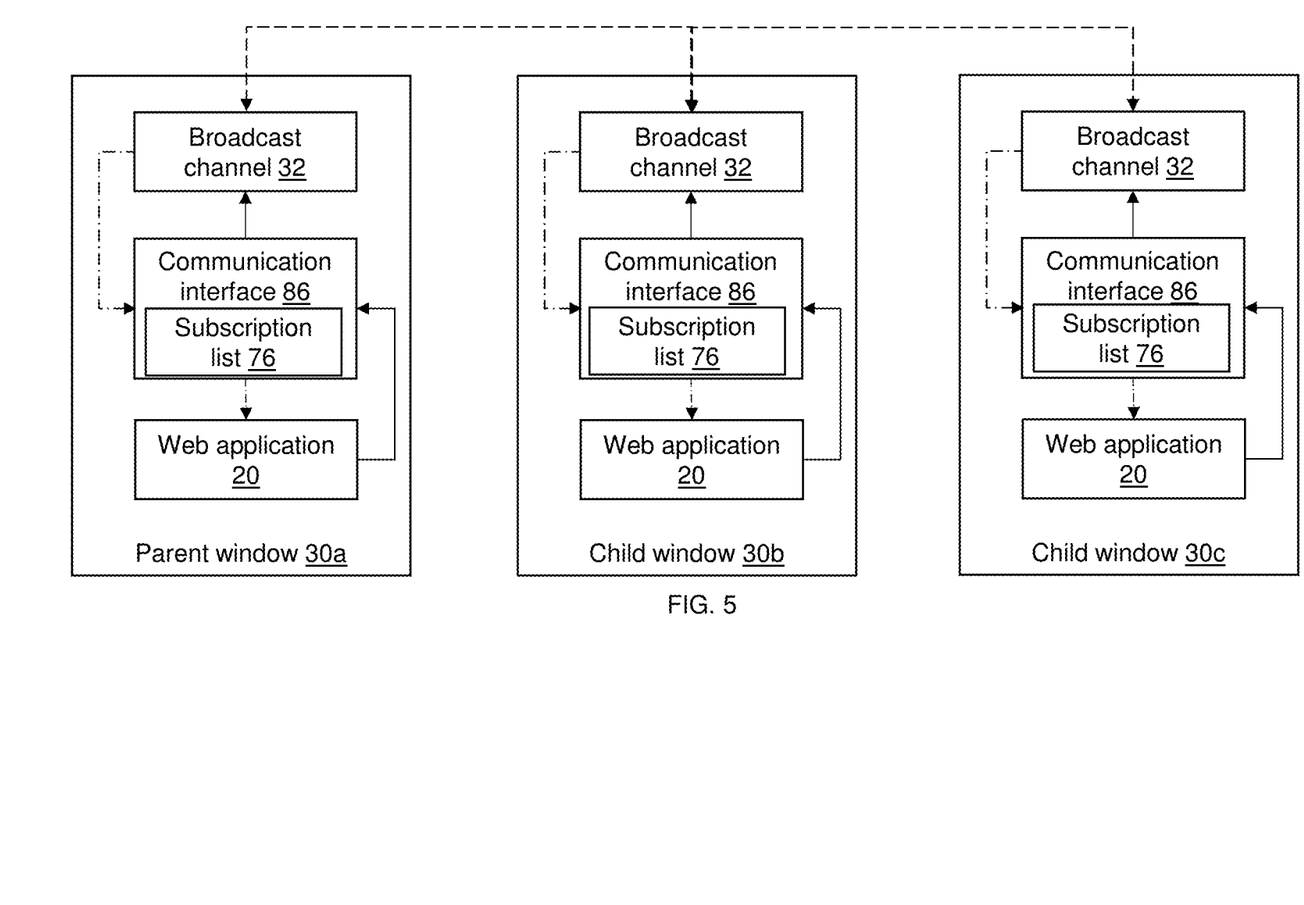
FIG. 5 is schematic diagram depicting communication between multiple windows via a broadcast channel.

The parent window 30*a* and the child window(s) 30*b*-30*f* may each load an inter-window communication interface 86 (also referred to as a communication interface or above as an inter-window module) from the application page 22. The inter-window communication interface 86 may be configured to act as an interface between the broadcast channel 32 and the web application 20. The inter-window communication interface 86 receives the messages 70 from the broadcast channel 32 and provides the messages 70 to the web application 20 when the message 70 is applicable to the web application 20 for the window 30. For example, within a given window, the inter-window communication interface 86 may provide the message 70 to the web application 20 when the message 70 includes a topic that a component 72 of the web application 20 subscribes to.

As shown in FIG. 3 and as described above, when opened as a child window 30*b*-30*f*, the child window 30*b*-30*f* is passed a reference 88 to the parent window 30*a*. The child window 30*b*-30*f* may request the broadcast channel information 34 from the parent window 30*a* using the reference 88 to the parent window 30*a*. Also, when each of the child window(s) 30*b*-30*f* are opened as a child window, the child window receives a layout index 90. The child window 30*b*-30*f* may request the display information 26 based on the layout index 90.

For example, as opposed to receiving the display information 26 for each of the windows 30 of the window set, the child window 30*b*-30*f* may request only the display information 26 for a single window 30. For example, the display information 26 may be stored in an array with each window having a different array index. The layout index 90 received by the window 30 may represent one of the indexes of the array. In this way, the child window 30*b*-30*f* may receive only the location information 60 and component information 62 for one window so that the child window 30*b*-30*f* does not need to differentiate between the display information 26 for other child windows 30*b*-30*f* to determine which location information 60 and component information 62 to apply.

Turning back to FIG. 3, the parent window 30*a* may communicate with the server 12, and each of the child window(s) 30*b*-30*f* may communicate with the server 12 via the parent window 30*a*. That is, when a child window 30*b*-30*f* or a component 62 of a child window passes a server message 72 (e.g., a message addressed to the server 12) into the broadcast channel 32, the server message 72 may be passed to the parent window 30*a*. The parent window 30*a* may then pass the server message 72 to the server 12. Similarly, when a server message 72 is received from the server 12, the message may be received by the parent window 30*a*, and the parent window 30*a* may place the server message 12 into the broadcast channel 32.

The inter-window communication interface 86 may also be used to communicate global changes to the web application 20. For example, if a user changes a theme (e.g., coloring of the windows, change in text font size, etc.), the inter-window communication interface 86 may be used to pass this change to each of the windows 30.

With reference again to FIG. 5, communication between the windows 30 and within the windows 30 in a general embodiment is shown. The transfer of inter-window messages 70 is shown via the dashed line connecting the three windows 30*a*, 30*b*, 30*c*. The inter-window messages 70 are received by the broadcast channel 32 in each window and passed to the communication interface 86 (represented by the dash-dot line connecting the broadcast channel 32 and the communication interface 86). The communication interface 86 may review the received messages to determine if the messages are relevant to the web application 20. For example, the communication interface 86 may compare the received messages to the subscription list 76 to determine if the received message contains topic(s) subscribed to by components 62 of the window 30. If a received message is relevant to the web application 20, then the message is passed from the communication interface 86 to the web application 20. If the received message is not relevant to the web application 20, then the message may be discarded. A message may be irrelevant to the web application 20 if the message includes topics not subscribed to by any components of the web application 20 or if the message is not addressed to all of the windows 30 (e.g., a change in theme, etc.).

With continued reference to the general embodiment shown in FIG. 5, the web application 20 passes messages 70 to the communication interface 86. The communication interface 86 may place the message into the broadcast channel 32. For example, messages generated by the web application 20 may be flagged by the web application 20 as intended for dissemination via the broadcast channel 32. The communication interface 86 may place any messages in the broadcast channel 32 that are flagged for dissemination via the broadcast channel 32. Alternatively some messages may be intended for use only within the window 30 of the web application 20 and may be so marked. For example, a message may indicate an update to the subscription list 76. This message may be used by the communication interface 86 to update the subscription list 76 and then discarded without being placed into the broadcast channel 32.

Upon receiving a message that is placed onto the broadcast channel 32, the communication interface 86 may both place the message in the broadcast channel 32 (as represented by the solid line connecting the communication interface 86 and the broadcast channel 32), and compare the message to the subscription list 76 for the window of the communication interface 86. For example, the message may have been generated by a first component of the web application 20 and the message may be relevant to a second component of the web application 20. To ensure that messages generated by one component are received by all relevant components, the communication interface 86 may place the message into the broadcast channel 32 and compare the message to its own subscription list 76. If the message contains topic(s) subscribed to by components of the web application (as signified by the subscription list 76) then the message will be provided to the web application.

Figure 6:
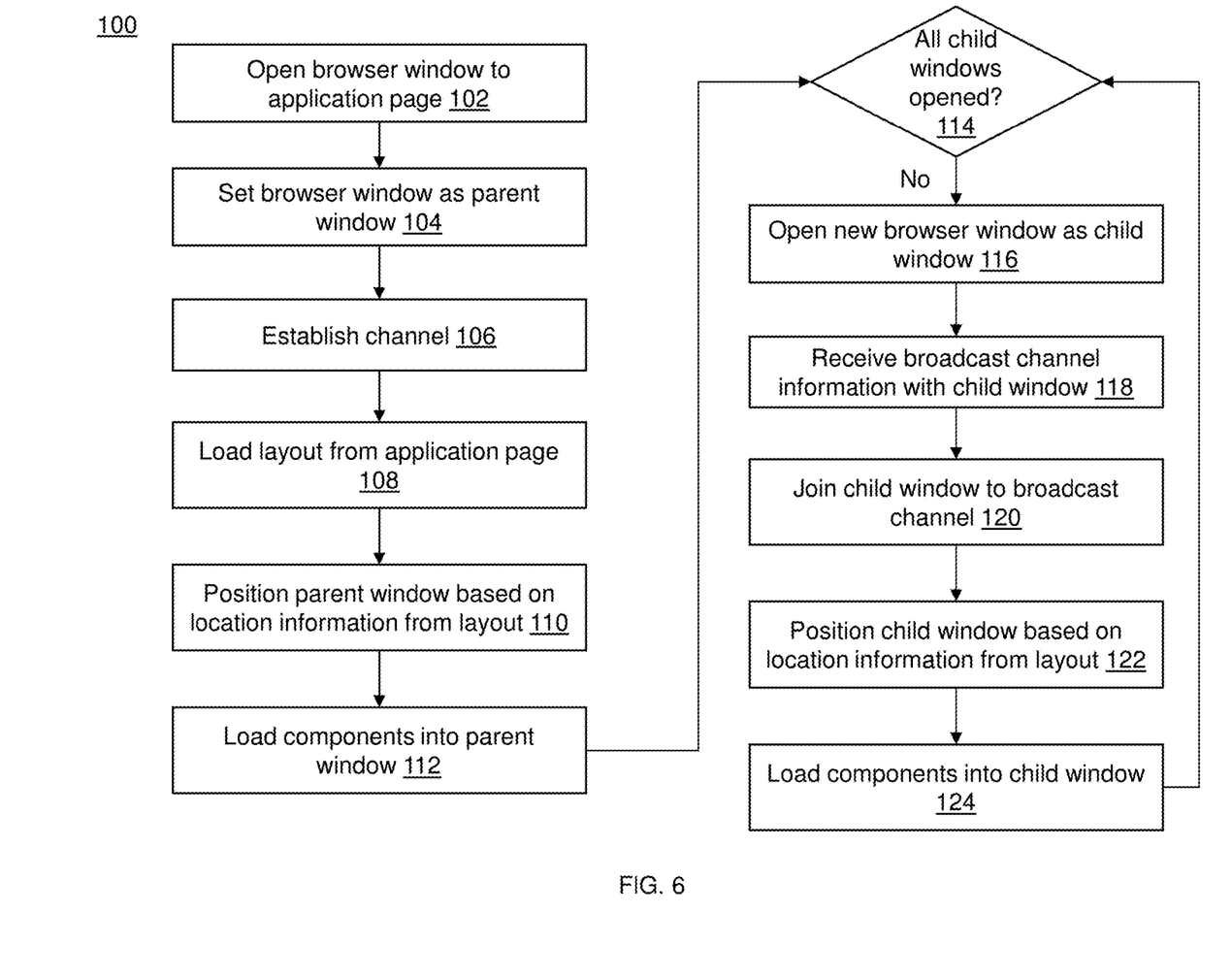
FIG. 6 is a flow diagram depicting a method for operating a web application.

Turning to FIG. 6, an embodiment of a method 100 for operating a web application 20 using circuitry 42 is shown. In process block 102, a browser window 30 is opened with the circuitry 42 to an application page 22 on a server 12 storing the web application 20. In process block 104, the browser window is set as a parent window 30a using the circuitry 42. In process block 106, the parent window 30a creates a broadcast channel 32 for sending and receiving messages.

In process block 108, the parent window 30a loads a layout 24 from the application page 22 specifying display information 26 for at least one child window 30b-30f and the parent window 30a. As described above, the display information 26 includes location information 60 and at least one component 62 for each of the child window(s) 30b-30f and the parent window 30a. In process block 110, the circuitry 42 positions the parent window 30a based on the location information 60 for the parent window 30a specified in the display information 26. In process block 112, the parent window 30a loads the component(s) 62 for the parent window 30a specified in the display information 26.

In decision block 114, a check is performed to see if all child windows have been opened. As described above, the check may be performed based on the number of windows open compared to the number of windows specified in the layout 24. If all of the child windows have not been opened, then processing moves to process step 116. In process step 116, the circuitry 42 opens a new browser window 30 as a child window 30b-30f.

In process block 118, the child window 30b-30f receives broadcast channel information 34 (e.g., from the parent window 30a). In process block 120, the child window 30b-30f joins the broadcast channel 32 using the broadcast channel information 34. In process block 122, the circuitry 42 positions the child window 30b-30f based on the location information 60 for the child window 30b-30f specified in the display information 26. In process block 124, the child window 30b-30f loads the component(s) 62 for the child window 30b-30f specified in the display information 26.

Following process block 124, processing returns to decision block 114 and a check is again performed to determine if additional child windows should be opened. If further child windows need to be opened, then processing again continues to process block 116. But, if all of the child windows have been opened, then processing stops.

Returning to FIG. 1, the circuitry 42 (and circuitry 52) may have various implementations. For example, the circuitry 42 may include any suitable device, such as a processor (e.g., CPU), programmable circuit, integrated circuit, memory and I/O circuits, an application specific integrated circuit, microcontroller, complex programmable logic device, other programmable circuits, or the like. The circuitry 42 may also include a non-transitory computer readable medium, such as random access memory (RAM), a read-only memory (ROM), an erasable programmable read-only memory (EPROM or Flash memory), or any other suitable medium. Instructions for performing the method 100 described above may be stored in the non-transitory computer readable medium and executed by the circuitry 42. The circuitry 42 may be communicatively coupled to the computer readable medium and network interface through a system bus, mother board, or using any other suitable structure known in the art.

The computer readable medium (memory) 40 (and memory 50) may be, for example, one or more of a buffer, a flash memory, a hard drive, a removable media, a volatile memory, a non-volatile memory, a random access memory (RAM), or other suitable device. In a typical arrangement, the computer readable medium 40 may include a non-volatile memory for long term data storage and a volatile memory that functions as system memory for the circuitry 42. The computer readable medium 40 may exchange data with the circuitry 42 over a data bus. Accompanying control lines and an address bus between the computer readable medium 40 and the circuitry 42 also may be present. The computer readable medium 40 is considered a non-transitory computer readable medium.

The network interface 44 (and network interface 54) may comprise a wireless network adaptor, an Ethernet network card, or any suitable device that provides an interface between the electronic device 12 and a network. The network interface 44 may be communicatively coupled to the computer readable medium, such that the network interface 44 is able to send data stored on the computer readable medium across the network and store received data on the computer readable medium. The network interface 44 may also be communicatively coupled to the circuitry 42 such that the circuitry is able to control operation of the network interface 44. The network interface 44, computer readable medium 40, and circuitry 42 may be communicatively coupled through a system bus, mother board, or using any other suitable manner as will be understood by one of ordinary skill in the art.

The electronic device 14 and the server 12 may be embodied as a general purpose computer including the memory, circuitry, and network interface described above. For example, the electronic device 14 and/or server 12 may be embodied as a computer server, a desktop computer, a laptop, a tablet computer, etc.

All ranges and ratio limits disclosed in the specification and claims may be combined in any manner. Unless specifically stated otherwise, references to "a," "an," and/or "the" may include one or more than one, and that reference to an item in the singular may also include the item in the plural.

Although the invention has been shown and described with respect to a certain embodiment or embodiments, equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

The invention claimed is:

1. A method of operating a web application stored on a server using circuitry, the method comprising:
    establishing, using a parent browser window corresponding to an application page, a channel for sending and receiving messages;
    loading, using the parent window, a layout from the application page specifying display information for at least one child window and the parent window, the display information including location information and at least one component for each of the at least one child window and the parent window;
    positioning, using the circuitry, the parent window based on the location information for the parent window specified in the display information;
    loading, using the parent window, the at least one component for the parent window specified in the display information;
    for each of the at least one child window having display information specified in the layout:
        opening, using the circuitry, a new browser window as a child window;
        receiving channel information with the child window;
        causing the child window to join the channel using the channel information;
        positioning the child window, using the circuitry, based on the location information for the child window specified in the display information; and
        loading, using the child window, the at least one component for the child window specified in the display information; and
    generating individual subscription lists for the parent window and each of the at least one child window, wherein each subscription list is associated with a respective window and the subscription list identifies topics subscribed to by the at least one component for the respective window, wherein each subscription list is stored by their respective window.

2. The method of claim 1, wherein the channel comprises a broadcast channel and the channel information comprises broadcast channel information, wherein the parent window and the at least one child window form a window set; and
    further comprising, when a communicating window of the window set communicates on the broadcast channel by posting a message to the broadcast channel, receiving the message by the parent window and each of the at least one child window.

3. The method of claim 2:
    wherein, upon a receiving window of the window set receiving a message:
        the receiving window identifies an included topic in the message;
        using the subscription list corresponding to the receiving window, the receiving window determines if the at least one component includes a subscribing component that subscribes to the included topic; and
        the receiving window passes the message to the subscribing component.

4. The method of claim 3, further comprising:
    receiving a request to load an additional component to a selected window of the window set;
    loading the additional component to the selected window;
    receiving, with the selected window, a subscription update from the additional component identifying an additional topic;
    updating, with the selected window, a subscription list stored by the selected window and corresponding to the selected window to include the additional topic in association with the additional component;
    receiving a request to unload an identified component from an identified window of the window set;
    removing the identified component from the identified window;
    updating, with the identified window, a subscription list stored by the identified window and corresponding to the identified window to remove any subscription associated with the identified component.

5. The method of claim 1, further comprising the parent window and each of the at least one child window each loading an inter-window communication interface from the application page, wherein the inter-window communication interface receives the messages from the broadcast channel and provides the messages to the web application when the message is applicable to the web application for the window.

6. The method of claim 1, wherein when each of the at least one child window are opened as a child window:
    the child window is passed a reference to the parent window; and
    the child window requests the broadcast channel information from the parent window using the reference to the parent window.

7. The method of claim 1, wherein when each of the at least one child window are opened as a child window:
    the child window receives a layout index; and
    the child window requests the display information based on the layout index.

8. The method of claim 7, further comprising, before setting the browser window as the parent window, accessing with the browser window a window manager included in the application page and the window manager labeling the browser window as the parent window;
    wherein the opening of the new browser window as a child window includes opening the child window to the application page and the child window accessing the window manager; and
    wherein the child window requests the display information from the window manager based on the layout index.

9. The method of claim 1, wherein the parent window communicates with the server and each of the at least one child window communicate with the server via the parent window.

10. The method of claim 9, wherein the parent window and the at least one child window communicate using websockets.

11. A web application stored on a non-transitory computer readable medium that, when executed by circuitry, causes the circuitry to:
    establish, using a parent browser window corresponding to an application page, a channel for sending and receiving messages;
    load into the parent window a layout from the application page specifying display information for at least one child window and the parent window, the display information including location information and at least one component for each of the at least one child window and the parent window;
    position the parent window based on the location information for the parent window specified in the display information;
    load into the parent window the at least one component for the parent window specified in the display information;
    for each of the at least one child window having display information specified in the layout:
        open a new browser window as a child window;
        receive with the child window channel information;
        cause the child window to join the channel using the channel information;
        position the child window based on the location information for the child window specified in the display information; and
        load into the child window the at least one component for the child window specified in the display information; and
    generate individual subscription lists for the parent window and each of the at least one child window, wherein each subscription list is associated with a respective window and the subscription list identifies topics subscribed to by the at least one component for the respective window, wherein each subscription list is stored by their respective window.

12. The web application of claim 11, further comprising the parent window and each of the at least one child window each loading an inter-window communication interface from the application page, wherein the inter-window communication interface receives the messages from the broadcast channel and provides the messages to the web application when the message is applicable to the web application for the window.

13. The web application of claim 11, wherein when each of the at least one child window are opened as a child window:
    the child window is passed a reference to the parent window; and
    the child window requests the broadcast channel information from the parent window using the reference to the parent window.

14. The web application of claim 11, wherein when each of the at least one child window are opened as a child window:
    the child window receives a layout index; and
    the child window requests the display information based on the layout index.

15. The web application of claim 14, further comprising, before setting the browser window as the parent window, the browser window accessing a window manager included in the application page and the window manager labeling the browser window as the parent window;
    wherein the opening of the new browser window as a child window includes opening the child window to the application page and the child window accessing the window manager; and
    wherein the child window requests the display information from the window manager based on the layout index.

16. The web application of claim 11, wherein the parent window communicates with the server and each of the at least one child window communicate with the server via the parent window.

17. The web application of claim 16, wherein the parent window and the at least one child window communicate using web sockets.

18. A web application stored on a non-transitory computer readable medium that, when executed by circuitry, causes the circuitry to:
    establish, using a parent browser window corresponding to an application page, a channel for sending and receiving messages;
    load into the parent window a layout from the application page specifying display information for at least one child window and the parent window, the display information including location information and at least one component for each of the at least one child window and the parent window;
    position the parent window based on the location information for the parent window specified in the display information;
    load into the parent window the at least one component for the parent window specified in the display information;
    for each of the at least one child window having display information specified in the layout:
        open a new browser window as a child window;
        receive with the child window channel information;
        cause the child window to join the channel using the channel information;
        position the child window based on the location information for the child window specified in the display information; and
        load into the child window the at least one component for the child window specified in the display information; and
    generate individual subscription lists for the parent window and each of the at least one child window, wherein each subscription list is associated with a respective window and the subscription list identifies topics subscribed to by the at least one component for the respective window, wherein each subscription list is stored by their respective window;

wherein the channel comprises a broadcast channel and the channel information comprises broadcast channel information;

wherein the parent window and the at least one child window form a window set; and when a communicating window of the window set communicates on the broadcast channel by posting a message to the broadcast channel, the message is received by the parent window and each of the at least one child window.

19. The web application of claim 18:

wherein, upon a receiving window of the window set receiving a message:
- the receiving window identifies an included topic in the message;
- using the subscription list corresponding to the receiving window, the receiving window determines if the at least one component includes a subscribing component that subscribes to the included topic; and
- the receiving window passes the message to the subscribing component.

20. The web application of claim 19, further comprising:

receiving a request to load an additional component to a selected window of the window set;

loading the additional component to the selected window;

the selected window receiving a subscription update from the additional component identifying an additional topic;

the selected window updating a subscription list stored by the selected window and corresponding to the selected window to include the additional topic in association with the additional component;

receiving a request to unload an identified component from an identified window of the window set;

removing the identified component from the identified window;

the identified window updating a subscription list stored by the identified window and corresponding to the identified window to remove any subscription associated with the identified component.

\* \* \* \* \*